United States Patent
Takagi et al.

(10) Patent No.: US 11,198,173 B2
(45) Date of Patent: Dec. 14, 2021

(54) ROTATING MEMBER AND FORMING METHOD THEREOF

(71) Applicant: TSUBAKIMOTO CHAIN CO., Osaka (JP)

(72) Inventors: Yudai Takagi, Osaka (JP); Yuji Kurematsu, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 261 days.

(21) Appl. No.: 16/505,912

(22) Filed: Jul. 9, 2019

(65) Prior Publication Data

US 2020/0101517 A1  Apr. 2, 2020

(30) Foreign Application Priority Data

Sep. 27, 2018  (JP) .............................. JP2018-182641

(51) Int. Cl.
 *B21J 5/12* (2006.01)
 *F16H 55/30* (2006.01)
 *B21D 35/00* (2006.01)

(52) U.S. Cl.
 CPC .............. *B21J 5/12* (2013.01); *B21D 35/001* (2013.01); *F16H 55/30* (2013.01)

(58) Field of Classification Search
 CPC .......... F16H 55/30; F16H 55/32; F16H 55/36; F16H 55/38; F16H 2055/325
 USPC ................................................. 474/152, 161
 See application file for complete search history.

(56) References Cited

U.S. PATENT DOCUMENTS

| | | | | |
|---|---|---|---|---|
| 1,986,598 A * | 1/1935 | Oakley | ................... | F16H 55/30 226/76 |
| 3,917,425 A * | 11/1975 | Allaben, Jr. | .......... | F16C 35/073 403/371 |
| 4,044,621 A * | 8/1977 | McGregor, Sr. | ......... | B62J 13/00 474/144 |
| 4,407,598 A * | 10/1983 | Hendershot | ............. | F16D 1/033 403/4 |
| 4,631,974 A * | 12/1986 | Wiegand | ................. | F16H 55/06 474/152 |
| 6,398,654 B1 * | 6/2002 | Viaud | ....................... | F16D 9/06 464/30 |
| 6,443,382 B1 * | 9/2002 | Bae | ....................... | B60R 22/405 242/382.6 |
| 7,472,467 B2 * | 1/2009 | Abeln | ....................... | F16B 4/00 29/557 |
| 2006/0172807 A1 * | 8/2006 | Shao | ........................ | F16D 7/08 464/35 |

(Continued)

*Primary Examiner* — Henry Y Liu
(74) *Attorney, Agent, or Firm* — Westerman, Hattori, Daniels & Adrian, LLP

(57) ABSTRACT

To provide a rotating member that allows formation of protrusions to be dug into an opposite surface with a simple configuration, and that can prevent a direction-dependent reduction of anti-slip effect and provide sufficient slip prevention in the direction of torque as well as in the radial direction, and a method of forming this rotating member. The rotating member has a boss and an anti-slip surface on at least one of both axial end faces of the boss. The anti-slip surface includes a plurality of crater-like depressions each having a peripheral protrusion. At least some of the plurality of crater-like depressions are arranged serially to form a plurality of crater chains.

6 Claims, 4 Drawing Sheets

(56) References Cited

U.S. PATENT DOCUMENTS

| | | | |
|---|---|---|---|
| 2014/0179474 A1* | 6/2014 | Florczyk | F16H 55/30 |
| | | | 474/160 |
| 2015/0080158 A1* | 3/2015 | Van Der Heijde | F16H 9/18 |
| | | | 474/43 |
| 2017/0314665 A1* | 11/2017 | Garcia | F16H 55/171 |
| 2018/0249819 A1* | 9/2018 | Chan | A46D 1/0207 |

* cited by examiner

ROTATING MEMBER AND FORMING METHOD THEREOF

BACKGROUND OF THE INVENTION

1. Field of the Invention

The present invention relates to a rotating member having a boss and an anti-slip surface on at least one of both axial end faces of the boss, and to a forming method thereof.

2. Description of the Related Art

Rotating members having a boss processed to have an anti-slip surface on at least one of its axial end faces so that torque can be transmitted from this end face have been known.

When a sprocket 500, which is a rotating member having a boss 501 and a plurality of teeth 502 formed along the outer periphery as shown in FIG. 1A and FIG. 1B, for example, is fixed to a crankshaft (not shown), the boss 501 is inserted into an end portion of the crankshaft. The sprocket is fastened with a bolt or the like in the axial direction, so that torque is transmitted between the end face of the crankshaft and an end face 503 of the boss 501.

It has been known to form an anti-slip surface 511 on the end face 503 that makes contact with the opposing end face to prevent slippage for such a rotating member.

Shot peening is known as a common method of forming an anti-slip surface wherein a surface is roughened to increase the frictional coefficient.

It is also known to provide pits and bumps on an end face of a boss of a sprocket by laser processing and to cause the bumps to actively dig into the opposing surface by applying a fastening force, so as to achieve firm retention (see, for example, U.S. Pat. No. 7,472,467).

SUMMARY OF THE INVENTION

The surface roughened by shot peening or the like has an increased frictional coefficient, but protrusions that will dig into the opposing surface can hardly be formed by this method.

The laser processing technique described in U.S. Pat. No. 7,472,467 allows for formation of protrusions that will dig into the opposing surface. However, the resultant protrusions have smooth curved tops because they are formed by molten material building up around the cut grooves. Moreover, there are requirements that had to be satisfied such as the issue of laser-induced thermal hardening, materials of the opposing surface, etc. Furthermore, the laser output had to be adjusted precisely.

There was also the problem of high production cost because the laser processing equipment itself was expensive.

Yet another problem was that, since the protrusions formed on both sides of a groove formed by laser-processing are linear along the groove, the anti-slip effect was smaller in the direction parallel to the groove.

U.S. Pat. No. 7,472,467 shows protrusions formed at end portions of grooves by not forming the groove continuously as in the upper sections of FIG. 4 and FIG. 6. However, since the laser-processed grooves have an extremely small width, the expected anti-slip effect along the direction parallel to the grooves is very small.

In other words, the problem is that when radial grooves are formed to provide slip prevention with respect to rotational torque, sufficient slip prevention cannot be provided in the radial direction, because of which looseness of the rotating member due to vibration or axial displacement cannot be sufficiently prevented.

An object of the present invention is to solve these problems and to provide a rotating member that allows formation of protrusions to be dug into an opposite surface with a simple configuration, and that can prevent a direction-dependent reduction of anti-slip effect and provide sufficient slip prevention in the direction of torque as well as in the radial direction, and a forming method of this rotating member.

To solve the above-noted problems, the rotating member according to the present invention includes a boss and an anti-slip surface on at least one of both axial end faces of the boss, wherein the anti-slip surface includes a plurality of crater-like depressions each having a peripheral protrusion, and at least some of the plurality of crater-like depressions are arranged serially to form a plurality of crater chains.

To solve the above-noted problems, the method of forming a rotating member including a boss and an anti-slip surface on at least one of both axial end faces of the boss, according to the present invention, includes the step of forming a plurality of crater-like depressions each having a peripheral protrusion on the anti-slip surface by punching, wherein at least some of the plurality of crater-like depressions are formed by serial punching to form a plurality of crater chains.

According to the rotating member set forth in the present invention, and the method of forming an anti-slip surface on the rotating member set forth in the present invention, a plurality of crater-like depressions having peripheral protrusions are formed on the anti-slip surface by punching. Since the peripheral protrusions formed by punching stand upright with sharp tips, they can easily dig into the opposing surface.

Since the peripheral protrusions are formed continuously around the punched marks, they provide the anti-slip effect in all directions when they dig into the opposing surface. Thus a direction-dependent reduction in the anti-slip effect can be minimized, and sufficient slip prevention can be provided not only in the torque direction but also in the radial direction.

At least some of the plurality of punched depressions are formed by serial punching to form a plurality of crater chains. This imparts regularity to the layout of the peripheral protrusions and facilitates punching, as well as enables a difference to be provided intentionally in the level of anti-slip effect depending on the direction by varying the directional density of the peripheral protrusions.

For the punching, an all-purpose device can be used, which is easily controllable, so that the rotating member can be produced with a simple configuration and at lower cost.

With the configuration set forth in the present invention, the serial punching to form serial depressions is performed such that $p/D \leq 1$ is satisfied, wherein D is the diameter of the ridge line of the peripheral protrusion and p is the pitch between adjacent crater-like depressions. This way, the density of the peripheral protrusions is increased along the direction in which the crater chains extend. As a result, the anti-slip effect in the direction perpendicular thereto is significantly increased.

The serial punching allows protrusions of a certain height to be left in overlapping portions between the peripheral protrusions of adjacent crater-like depressions, which can prevent a reduction in the anti-slip effect in the direction in which the crater chains extend.

The serial punching also enables formation of even higher protrusions than the peripheral protrusions near both ends of the overlapping portions between the peripheral protrusions of adjacent crater-like depressions, which increases the anti-slip effect even more.

With the configuration set forth in the present invention, the anti-slip effect with respect to rotational torque can be increased significantly.

With the configuration set forth in the present invention, the deformed protrusions can be oriented randomly in various directions as a whole. As a result, the anti-slip effect can be made uniform in the direction in which the crater chains extend.

This means that punching can be performed successively from the radially inner side to the radially outer side of the rotating member and from the radially outer side to the radially inner side alternately in a continuous manner, which further facilitates the production.

With the configuration set forth in the present invention, the anti-slip effect in the radial direction can be increased significantly.

The configuration set forth in the present invention allows setting of a suitable balance between the anti-slip effect with respect to rotational torque and the anti-slip effect in the radial direction.

DESCRIPTION OF THE PREFERRED EMBODIMENT

The rotating member of the present invention includes a boss and an anti-slip surface on at least one of both axial end faces of the boss, wherein the anti-slip surface includes a plurality of crater-like depressions each having a peripheral protrusion, and at least some of the plurality of crater-like depressions are arranged serially to form a plurality of crater chains. The method of forming a rotating member including a boss and an anti-slip surface on at least one of both axial end faces of the boss, according to the present invention, includes the step of forming a plurality of crater-like depressions each having a peripheral protrusion on the anti-slip surface by punching, wherein at least some of the plurality of crater-like depressions are formed by serial punching to form a plurality of crater chains. The present invention may have any specific configurations in so far as it provides a rotating member that allows formation of protrusions to be dug into an opposite surface with a simple configuration, and that can prevent a direction-dependent reduction of anti-slip effect and provide sufficient slip prevention in the direction of torque as well as in the radial direction, and a forming method of this rotating member.

Embodiment 1

Figure 1A:
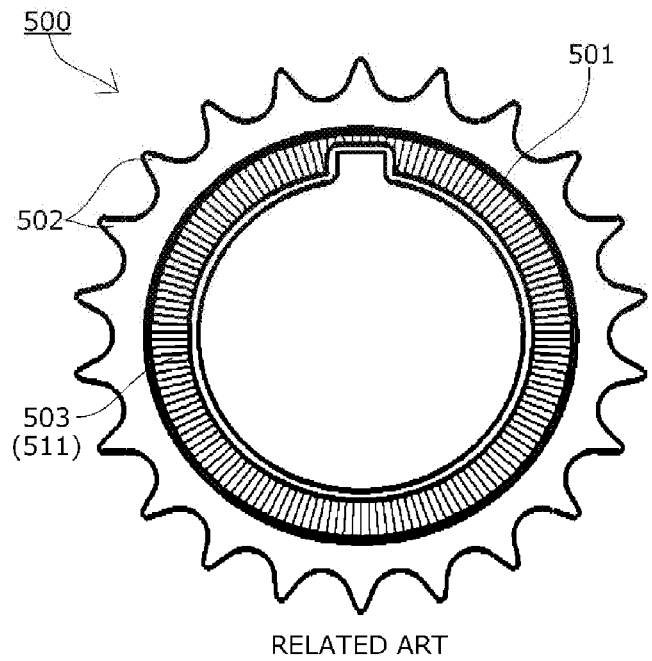
FIG. 1A is a front view of a rotating member (sprocket) having an anti-slip surface, shown for reference.
Figure 1B:
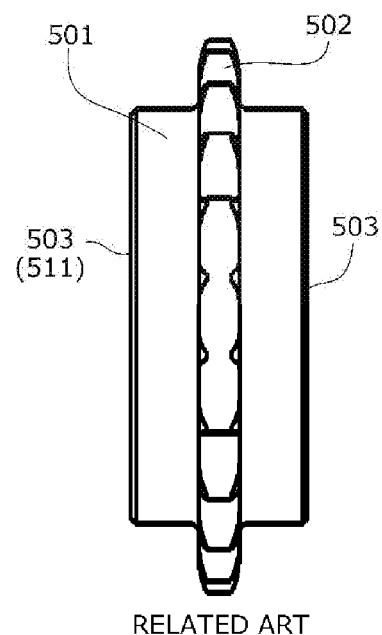
FIG. 1B is a side view of a rotating member (sprocket) having an anti-slip surface, shown for reference.
Figure 2:
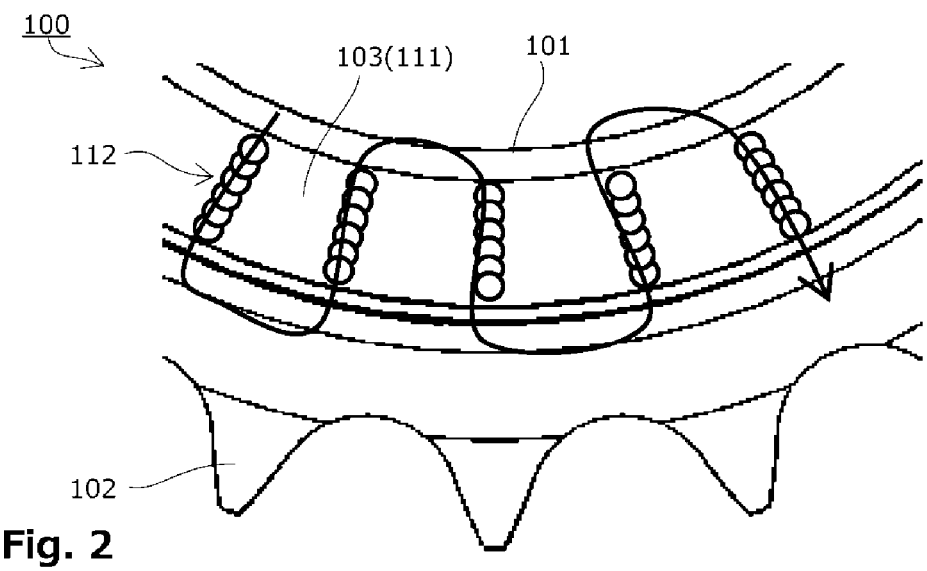
FIG. 2 is a partial front view of a rotating member according to a first embodiment of the present invention.

As shown in FIG. 2, the sprocket 100, which is the rotating member according to a first embodiment of the present invention, includes a plurality of teeth 102 formed along the outer circumference, and a boss 101 that is inserted to an end portion of a crankshaft (not shown) when fixed thereto. Fastening the sprocket axially with a bolt or the like causes an anti-slip surface 111 formed on an end face 103 of the boss 101 to contact the crankshaft so that torque can be transmitted.

The anti-slip surface 111 includes a plurality of crater chains 112 that are serially punched crater-like depressions 120 each having a peripheral protrusion 121. The crater chains 112 are arranged radially.

The plurality of crater-like depressions 120 in each crater chain 112 are serially punched such that p/D 1 is satisfied, wherein D is the diameter of the ridge line 122 of the peripheral protrusion 121 and p is the pitch between adjacent crater-like depressions 120, i.e., such that a ridge line 122 of a peripheral protrusion 121 of a crater-like depression 120 that has been formed by punching directly before succeeding punching overlaps with a peripheral protrusion 121 of an adjacent crater-like depression 120 that is formed by the succeeding punching.

Figure 3:
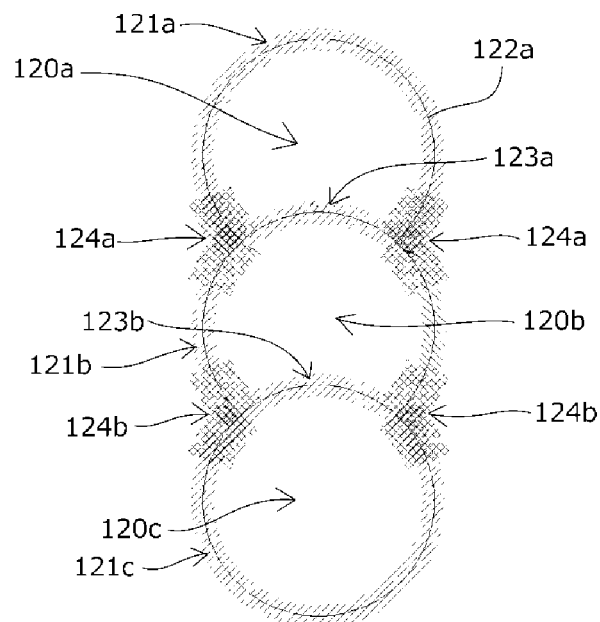
FIG. 3 is a schematic illustration of a crater chain.

The shape changes that occur with serial punching to form overlapping depressions will be described with reference to FIG. 3.

First, when an uppermost crater-like depression 120a is punched, a peripheral protrusion 121a having a ridge line 122a is formed.

Next, when a middle crater-like depression 120b is punched so as to overlap the crater-like depression 120a, a lower, overlapping part of the peripheral protrusion 121a of the crater-like depression 120a deforms into a circumferential shape continuous with the peripheral protrusion 121b of the crater-like depression 120b, resulting in a deformed protrusion 123a.

Near both ends of the overlapped portion, more prominent protrusions 124a are formed, whose peaks protrude even more than the peripheral protrusion 121a.

Another deformed protrusion 123b and more prominent protrusions 124b are formed when the next crater-like depression 120c is punched following the formation of the crater-like depression 120b, and this is successively repeated.

In this embodiment, the plurality of radial crater chains 112 are successively punched alternately from the radially inner side to the radially outer side and from the radially outer side to the radially inner side of the sprocket 100 along the course indicated by an arrow in FIG. 2.

Figure 4:
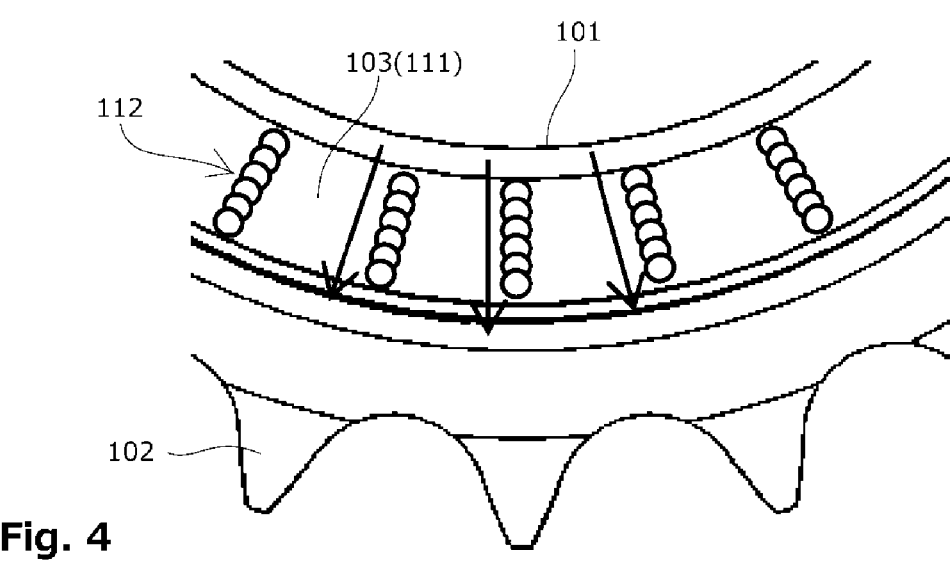
FIG. 4 is a partial front view of a rotating member according to a variation example of the first embodiment.
Figure 5:
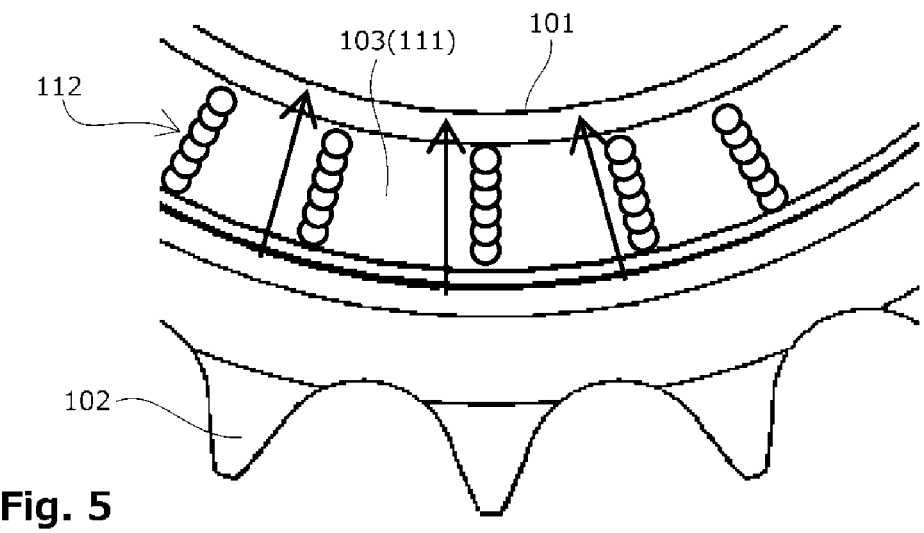
FIG. 5 is a partial front view of a rotating member according to another variation example of the first embodiment.

All of the plurality of radial crater chains 112 may be formed from the radially inner side to the radially outer side of the sprocket 100 (with the deformed protrusions positioned on the radially inner side) as shown in FIG. 4, or, from the radially outer side to the radially inner side (with the deformed protrusions positioned on the radially outer side) as shown in FIG. 5.

Alternatively, the crater chains 112 formed from the radially inner side to the radially outer side, and from the radially outer side to the radially inner side, may be present in an irregular pattern.

Embodiment 2

Figure 6:
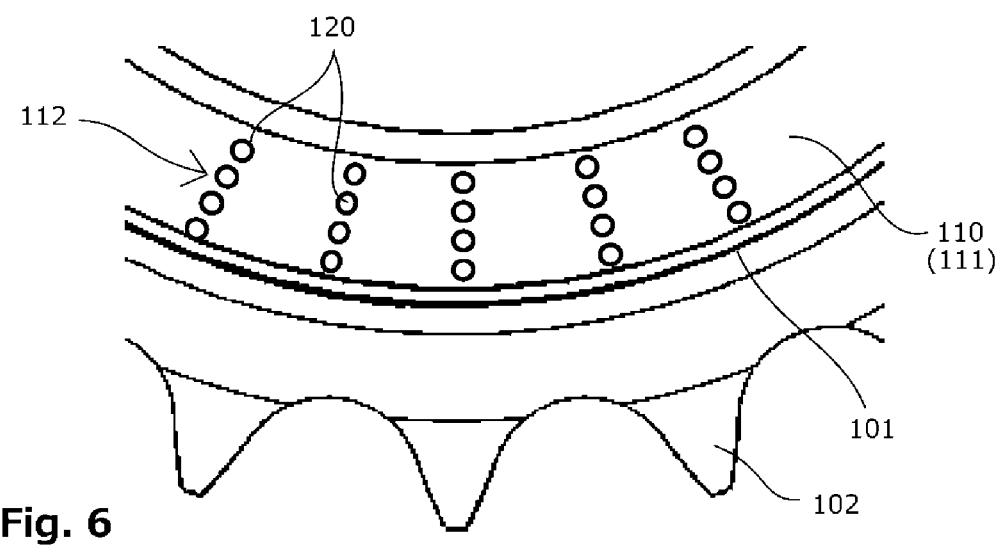
FIG. 6 is a partial front view of a rotating member according to a second embodiment of the present invention.

The sprocket, which is the rotating member according to a second embodiment of the present invention, includes a plurality of radially arranged crater chains 112, which are series of independent crater-like depressions not overlapping each other as shown in FIG. 6. Other features are the same as those of the previously described first embodiment.

Embodiment 3

Figure 7:
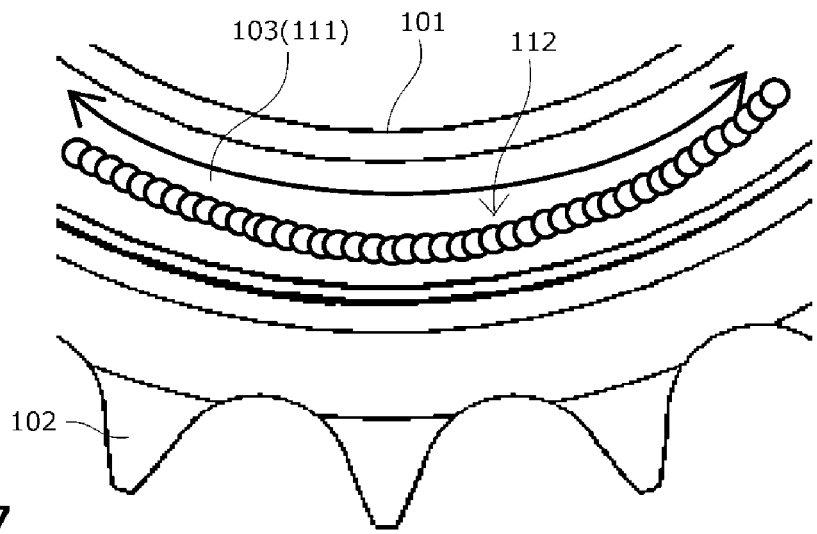
FIG. 7 is a partial front view of a rotating member according to a third embodiment of the present invention.

The sprocket, which is the rotating member according to a third embodiment of the present invention, has crater-like depressions that form a crater chain 112 so as to extend along the circumferential direction as shown in FIG. 7. Other features are the same as those of the previously described first embodiment.

While only a single crater chain 112 is shown in the drawing, there may be a plurality of circumferential crater chains 112 parallel to each other.

Embodiment 4

Figure 8:
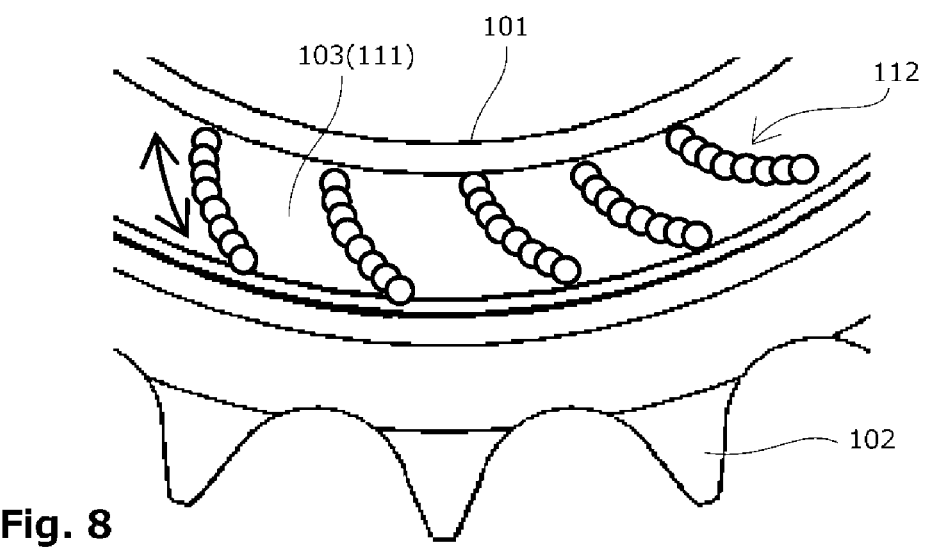
FIG. 8 is a partial front view of a rotating member according to a fourth embodiment of the present invention.

The sprocket, which is the rotating member according to a fourth embodiment of the present invention, has crater-like depressions that form a plurality of crater chains 112 so as to extend spirally as shown in FIG. 8. Other features are the same as those of the previously described first embodiment.

It is assumed that crater chains are provided uniformly all around in each of the embodiments described above. Alternatively, the density and direction of punched crater chains may be varied in parts or changed continually, the layouts of various embodiments may be employed in combinations, or crater chains may be provided to intersect each other.

While crater-like depressions shown here as examples are formed to have circular peripheral protrusions, they may be formed in an oval or polygonal shape as long as they provide similar effects.

For the punching, any device may be used as long as it allows serial punching on an end face.

While the rotating member shown here as one example is a sprocket, the rotating member can be any component that receives torque on its end face and the invention is applicable in various industrial fields.

The invention claimed is:

1. A rotating member comprising a boss and an anti-slip surface on at least one of both axial end faces of the boss, wherein
   the anti-slip surface includes a plurality of crater-like depressions each having a peripheral protrusion, and
   at least some of the plurality of crater-like depressions are arranged serially to form a plurality of crater chains.

2. The rotating member according to claim 1, wherein the crater chains are each formed by the plurality of crater-like depressions arranged such that p/D<1 is satisfied, wherein D is a diameter of a ridge line of the peripheral protrusion and p is a pitch between adjacent crater-like depressions.

3. The rotating member according to claim 1, wherein some or all of the plurality of crater chains are formed so as to extend radially on the anti-slip surface.

4. The rotating member according to claim 3, wherein each of the crater-like depressions constituting the crater chains includes, as a part of the peripheral protrusion, a deformed protrusion formed by punching to form an adjacent crater-like depression, and
   the plurality of crater chains include both of a crater chain formed by the crater-like depressions arranged such that the deformed protrusion is positioned on a radially outer side of the boss, and a crater chain formed by the crater-like depressions arranged such that the deformed protrusion is positioned on a radially inner side of the boss.

5. The rotating member according to claim 1, wherein some or all of the plurality of crater chains are formed so as to extend circumferentially on the anti-slip surface.

6. The rotating member according to claim 1, wherein some or all of the plurality of crater chains are formed so as to extend spirally on the anti-slip surface.

* * * * *